United States Patent [19]

Horst

[11] 3,899,486
[45] Aug. 12, 1975

[54] WATER-SOLUBLE PHTHALOCYANINE REACTIVE DYESTUFFS CONTAINING AN ETHYLSULFONYL SUBSTITUENT

[75] Inventor: Jager Horst, Cologne, Germany

[73] Assignee: Bayer Aktiengesellschaft, Leverkusen-Bayerwerk, Germany

[22] Filed: Dec. 31, 1969

[21] Appl. No.: 889,672

[30] Foreign Application Priority Data
Jan. 10, 1969   Germany............................ 1901041

[52] U.S. Cl.... 260/239.6; 260/239.7; 260/247.1 M; 260/314.5; 260/397.6; 260/457; 260/562 N; 8/1 XA; 8/12; 8/54.2; 8/178 R
[51] Int. Cl............................................ C07d 27/76
[58] Field of Search.......... 260/314.5, 239.6, 562 N, 260/239.7, 247.1 M

[56] References Cited
UNITED STATES PATENTS
3,535,333   10/1970   Rudolf et al..................... 260/314.5

OTHER PUBLICATIONS
The Ring Index (2nd ed.) Patterson et al. (1960) p. 1196.
Phthalocyanine Compounds, Moser et al. (1963) p. 8.

*Primary Examiner*—Henry R. Jiles
*Assistant Examiner*—S. D. Winters
*Attorney, Agent, or Firm*—Plumley & Tyner

[57] ABSTRACT

Phthalocycanine reactive dyestuffs corresponding to the formula

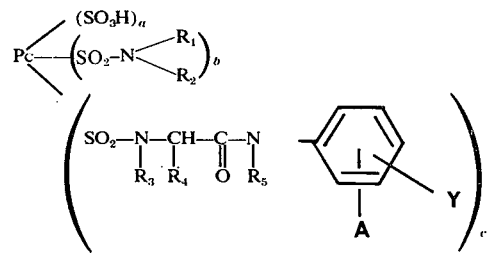

wherein Pc represents the radical of a phthalocyanine, $R_1$ and $R_2$ are hydrogen, or identical or different alkyl radicals which may be cyclized and/or further substituted, or they are optionally substituted cycloalkyl, aralkyl or aryl radicals; $R_3$ represents hydrogen, an alkyl radical with 1–5 carbon atoms, which may be substituted by water-solubilizing or by not water-solubilizing groups, or a cycloalkyl radical; $R_4$ and $R_5$ are hydrogen or lower alkyl radicals; A is hydrogen or a substituent; Y is the group $-SO_2-CH_2-CH_2-OSO_3H$, $-SO_2-CH=CH_2$, $-SO_2-CH_2-CH_2-S-SO_3H$; $a$ is a number from 0 to 3, $b$ is a number from 0 to 2, and $c$ is a number from 1 to 4, the sum total of $a$, $b$, and $c$ not exceeding 4. The dyestuffs of this invention are useful in dyeing wool, silk, leather, linear polyamides and particularly cellulose, containing fibrous materials such as linen, regenerated cellulose, and cotton.

9 Claims, No Drawings

WATER-SOLUBLE PHTHALOCYANINE REACTIVE DYESTUFFS CONTAINING AN ETHYLSULFONYL SUBSTITUENT

The subject matter of the invention relates to new water-soluble phthalocyanine dyestuffs which, in the form of their free acids, correspond to the formula

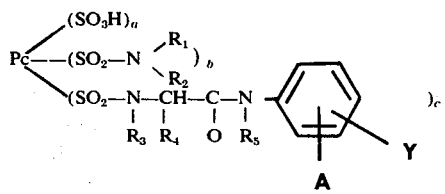

In the above formula, Pc represents the radical of a phthalocyanine, $R_1$ and $R_2$ are hydrogen, or identical or different alkyl radicals which may be cyclized and/or further substituted, or they are optionally substituted cycloalkyl, aralkyl or aryl radicals; $R_3$ represents hydrogen, an alkyl radical with 1–5 carbon atoms, which may be substituted by water-solubilizing or by not water-solubilizing groups, or a cycloalkyl radical; $R_4$ and $R_5$ are hydrogen or lower alkyl radicals; A is hydrogen or a substituent; Y is the group $-SO_2-CH_2-CH_2-OSO_3H$, $-SO_2-CH=CH_2$, $-SO_2-CH_2-CH_2-S-SO_3H$; $a$ is a number from 0 to 3, $b$ is a number from 0 to 2, and $c$ is a number from 1 to 4, the sum total of $a$, $b$ and $c$ not exceeding 4.

In the dyestuffs of the formula (I), each sulphonic acid or sulphonamide group is linked in the 3- or 4-position with another benzene ring of the phthalocyanine. Suitable metals are cobalt, nickel and copper.

Optionally substituted hydrocarbon radicals $R_1$ and $R_2$ to be mentioned are, for example: lower alkyl radicals, such as methyl, ethyl, propyl, butyl and amyl; substituted lower alkyl radicals are, e.g., lower hydroxyalkyl radicals, such as β-hydroxyethyl, γ-hydroxypropyl; β,γ-dihydroxypropyl and pentahydroxyhexyl; lower carboxyalkyl radicals, such as β-carboxyethyl; lower sulphoalkyl radicals, such as β-sulphoethyl; cycloalkyl radicals, such as cyclohexyl; aralkyl radicals, such as benzyl; aryl radicals, such as phenyl and naphthyl; substituted aryl radicals, such as ethoxyphenyl, methoxyphenyl, sylphophenyl and carboxyphenyl.

Examples of the radical $R_3$ are methyl, ethyl, β-hydroxyethyl, β-sulphoethyl, propyl, isopropyl, cyclohexyl and butyl radicals.

Suitable lower alkyl radicals $R_4$ and $R_5$ are, for example, the methyl and ethyl group. $R_4$ and $R_5$ preferably stand for hydrogen.

Substituents A to be mentioned are, for example, hydroxy, alkoxy, carboxylic acid, sulphonic acid, arylamino or nitro groups as well as halogen atoms.

The new phthalocyanine compounds of the formula (I) can be produced by condensing, simultaneously or successively, a phthalocyanine sulphonic acid chloride, preferably in the form of an aqueous suspension, which corresponds to the formula

in which Pc has the same meaning as above, $m$ stands for 0, 1 or 2, and $n$ for 2, 3 or 4, the sum total of $m$ and $n$ not exceeding 4, with a compound of the formula

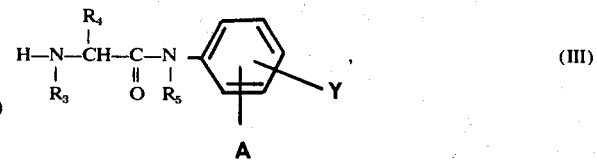

in which $R_3$, $R_4$, $R_5$, A and Y have the same meaning as above, and optionally with a compound of the formula

in which $R_1$ and $R_2$ have the same meaning as already given above, and optionally treating the resultant dyestuffs with alkali and optionally adding sodium thiosulphate on the vinylsulphone dyestuffs thus obtained.

In this condensation sulphonic acid chloride groups may be converted into sulphonic acid groups by hydrolysis. The reaction of the phthalocyanine sulphonic acid chloride with the compound of the formula (III) and the compound of the formula (IV) can be carried out in a single reaction step or in separate individual steps. In general, the simultaneous reaction (provided $b$ is to be greater than 0) is of advantage. A compound of the formula (IV) may here serve as acid-binding agent.

By a preferred method of carrying out the process the dyestuffs according to the invention can be obtained by using amines of the general formula

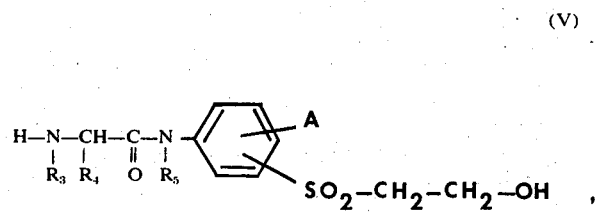

in which $R_3$, $R_4$, $R_5$ and A have the same meaning as above, instead of the compounds of the formula (III), subsequently converting the resultant condensation products in known manner into the acidic sulphuric acid esters and optionally treating them with alkali and possibly adding sodium thiosulphate on to the vinylsulphone dyestuffs thus obtainable, phthalocyanine dyestuffs of the formula (I) [Y = $-SO_2-CH_2-CH_2-S-SO_3H$] thus being formed.

The metal-containing phthalocyanine sulphonic acid chlorides used as starting substances according to the invention can be produced in known manner, for example, by treating the appropriate metal-containing phthalocyanines or the appropriate metal-containing phthalocyanine sulphonic acids with chlorosulphonic acid. The sulphochlorination may be effected in the presence of carbon tetrachloride or of acid chlorides, such as thionylchloride or phosphorus pentachloride, as described, for example, in German Patent Specification No. 891,121.

Suitable β-hydroxyethyl sulphone group-containing araliphatic amines of the formula (V) which are preferably to be used according to the process of the invention for the condensation with the appropriate metal-containing phthalocyanine sulphonic acid chlorides, the following amines are, for example:

β-hydroxyethyl-[4-(methylaminoacetylamino)-phenyl]-sulphone,
β-hydroxyethyl-[4-(ethylaminoacetylamino)-phenyl]-sulphone,
β-hydroxyethyl-[3-(methylaminoacetylamino)-phenyl]-sulphone,
β-hydroxyethyl-[3-(methylaminoacetylamino)-4-methoxy-phenyl]-sulphone,
β-hydroxyethyl-[2,5-dimethoxy-4-(methylaminoacetylamino)-phenyl]-sulphone,
β-hydroxyethyl-[4-methyl-3-(methylaminoacetylamino)-phenyl]-sulphone,
β-hydroxyethyl-[3-(methylaminoacetylamino-4-bromo-phenyl]-sulphone,
β-hydroxyethyl-[2,5-dichloro-4-(methylaminoacetylamino)-phenyl]-sulphone,
β-hydroxyethyl-[3-(methylaminoacetylamino)-4-hydroxyphenyl]-sulphone,
β-hydroxyethyl-[4-(β-sulphoethylaminoacetylamino)-phenyl]-sulphone,
β-hydroxyethyl-[4-(β-hydroxyethylaminoacetylamino)-phenyl]-sulphone,
β-hydroxyethyl-[4-(2-methylamino-propionylamino)-phenyl]-sulphone,
β-hydroxyethyl-[4-(methylaminoacetylamino)-3-carboxy-phenyl]-sulphone,
β-hydroxyethyl-[4-(methylaminoacetylamino)-3-sulpho-phenyl]-sulphone.

The amines of the formula (V) can be used for the process according to the invention either in the form of free bases or in the form of their water-soluble salts with halogen hydracids.

Examples of amines of the formula (IV) are ammonia, ethylamine, methylamine, propylamine, taurine, N-methyltaurine, aminoacetic acid, sarcosine, ethanolamine, diethanolamine, morpholine, benzylamine, aniline, m-sulphanilic acid, p-anisidine, 4-aminobenzoic acid etc.

The reaction of the phthalocyanine sulphochlorides of the formula (II)

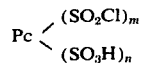

in which Pc, $m$ and $n$ have the same meaning as above,
with the compounds (V) and, if 'b is greater than O, with the compounds of the formula (IV) can be carried out in one single reaction step or in separate stages.

These acylations can be carried out in the presence of aqueous or non-aqueous solvents dependent upon the dissolving properties of the reaction components used, in solution or suspension and/or with the addition of acid-binding agents. For carrying out the reaction in a non-aqueous medium, organic solvents or diluents, for example, methanol, dimethyl formamide or pyridine may be considered. As acid-binding agents there may be used sodium bicarbonate, sodium carbonate, sodium hydroxide, tertiary organic bases, such as pyridine or triethylamine, or an excess of the amines of the formula (IV) employed. The reaction is carried out at weakly acidic to alkaline pH values. The reaction temperature required may vary within a wide range. As a rule, the operation is carried out between 0° and 60°C.

The second process step of the preferred embodiment of the invention, i.e. the conversion of the phthalocyanine sulphonamides containing β-hydroxyethyl sulphonyl groups obtained in the first reaction step, into their acidic sulphuric acid esters by treatment with sulphonating agents is carried out in known manner by treating the sulphonamides either with sulphuric acid or by reacting them with chlorosulphonic acid or sulphur trioxide or their complexes with tertiary amines, preferably in a tertiary amine as solvent or, alternatively, in an organic solvent with the addition of amidosulphonic acid.

The new phthalocyanine dyestuffs to be obtained according to the invention can be used for the dyeing and printing of materials of the greatest variety, for example, of wool, silk, leather or linear polyamides. The new dyestuffs are particularly suitable for the dyeing and printing of cellulose-containing materials of a fibrous structure, such as linen, regenerated cellulose and especially cotton. The application of the dyestuffs on to the cellulose fibres is carried out, for example, by treating the material with an aqueous solution of the dyestuff and an aqueous solution of an alkaline or acid-binding agent, such as sodium hydroxide, sodium bicarbonate, trisodium phosphate or sodium sulphide, or by a treatment with a printing paste containing the dyestuff as well as an acid-binding agent. The dyestuff solutions or printing pastes may contain, besides acid-binding agents or substances yielding such substances, urea, urethanes, or water-soluble amides of aliphatic carboxylic acids, for example, formamide, acetamide or malonic acid diamide. The treatment with the acid-binding agents may be carried out before, during or after application of the dyestuff, if desired, at an elevated temperature.

The dyestuffs obtainable according to the invention yield on the afore-mentioned materials dyeings and prints of pure blue to green shades which are characterised by good fastness to light, good fastness to chlorine and generally by very good fastness to wet processing.

The parts in the following Examples stand for parts by weight; the temperatures are given in degrees centigrade.

EXAMPLE 1

96 Parts of the copper phthalocyanine tetrasulphochloride obtained in usual manner by an after-treatment with thionylchloride are suspended in 2000 parts ice-water and the suspension is neutralised with a caustic soda solution. 62 Parts of the hydrochloride of β-hydroxyethyl-[4-methylaminoacetylamino)-phenyl]-sulphone in the form of an aqueous solution are subsequently added. The mixture is heated to 40° and the pH maintained between 9 and 10 by the dropwise addition of a caustic soda solution. The condensation is completed when caustic soda solution is no longer consumed. The dyestuff is quantitatively precipitated by the addition of a little sodium chloride and isolated by suction-filtration. After the drying at 100°, the finely ground product is introduced into 1000 parts concentrated sulphuric acid and the mixture is stirred overnight at room temperature. It is poured on to ice, and the precipitated dyestuff is filtered off. The moist paste is stirred in 1000 parts of water and neutralised with sodium carbonate. After salting out with sodium chloride, the product is again dried. In the form of the free sulphonic acid, the reaction product corresponds to the following average constitution β-hydroxyethyl-[4-(β-hydroxyethylaminoacetylamino)-phenyl]-sulphone, β-hydroxyethyl-[4-(β-sulphoethylaminoacetylamino)-phenyl]-sulphone, β-hydroxyethyl-[4-(ethylaminoacetylamino)-phenyl]-sulphone, β-hydroxyethyl-[4-cyclohexylaminoacetylamino)-phenyl]-sulphone, β-hydroxyethyl-[4-(methylamino-acetyl-N-methylamino)-phenyl]-sulphone.

EXAMPLE 2

96 Parts of the copper phthalocyanine tetrasulpho-

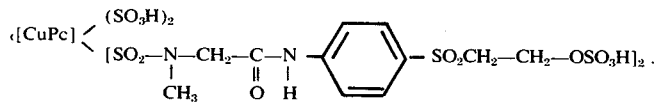

The dyestuff is very readily soluble in water.

When a cellulose fabric is printed with a printing paste which contains, per kilogram, 20 g of the dyestuff, 150 g urea, 300 ml water, 500 g alginate thickening, 20 g sodium bicarbonate and which was made up with water to 1 kilogram, subsequently dried, steamed at 150° for 1 minute, rinsed with hot water and soaped at the boil, an intense turquoise-blue dyeing is obtained. It should be emphasized that the not fixed portions are readily washed out, and that the print is very uniform on cotton and staple fibre.

A dyestuff of similar properties the dyeing of which exhibits a markedly more greenish shade is obtained when the copper phthalocyanine-(3)-tetrasulphonic acid chloride is replaced by an equivalent amount of nickel phthalocyanine-(3)-tetrasulphonic acid chloride.

When the β-hydroxyethyl-[4-(methylaminoacetylamino)-phenyl]-sulphone used in this Example is replaced by an equivalent amount of the compounds set out in the following, valuable reactive dyestuffs are likewise obtained which also dye cellulose fabrics in turquoise-blue shades.

β-hydroxyethyl-[4-(methylaminoacetylamino)-3-chloro-phenyl]-sulphone,

β-hydroxyethyl-[4-(methylaminoacetylamino)-3-methoxy-phenyl]-sulphone,

β-hydroxyethyl-[4-(methylaminoacetylamino-3-bromo-phenyl]-sulphone,

β-hydroxyethyl-[4-(methylaminoacetylamino)-3-nitro-phenyl]-sulphone,

β-hydroxyethyl-[4-(methylaminoacetylamino)-3-carboxy-phenyl]-sulphone,

β-hydroxyethyl-[4-(methylaminoacetylamino)-3-sulpho-phenyl]-sulphone,

β-hydroxyethyl-[4-(methylaminoacetylamino)-2,5-dichloro-phenyl]-sulphone,

β-hydroxyethyl-[4-(methylaminoacetylamino)-2,5-dimethoxy-phenyl]-sulphone,

β-hydroxyethyl-[4-(methylaminoacetylamino)-3-methyl-phenyl]-sulphone,

β-hydroxyethyl-[3-(methylaminoacetylamino)-phenyl]-sulphone, chloride obtained in usual manner by an after-treatment with thionylchloride are slurried in 2000 parts ice-water and the suspension is neutralised with a caustic soda solution. 31 Parts of the hydrochloride of β-hydroxyethyl-[4-(methylaminoacetylamino)-phenyl]-sulphone in the form of an aqueous solution are subsequently added. A pH of 9 is maintained by the dropwise addition of a 2N ammonia solution. The mixture is then heated to 40° – 45° and kept at this temperature until ammonia is no longer consumed for maintaining a constant pH. After the addition of sodium chloride the dyestuff is precipitated and dried at 100°. The dry dyestuff is introduced at room temperature into 1000 parts concentrated sulphuric acid and the mixture stirred overnight. It is then poured on to ice, the product is filtered off with suction and the paste is introduced into about 1000 parts of ice-water and neutralised by the careful addition of a caustic soda solution.

The dyestuff is again filtered off with suction and dried. In the form of the free sulphonic acid, the dyestuff corresponds to the following average constitution:

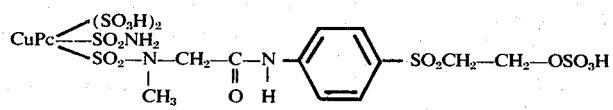

From a long bath the dyestuff yields an intense reddish turquoise shade of good fastness properties.

A dyestuff of similar properties, the dyeings of which however exhibit a markedly more greenish shade, is obtained when the copper phthalocyanine-(3)-tetrasulphonic acid chloride used is replaced by the equivalent amount of nickel-phthalocyanine-(3)-tetrasulphonic acid chloride.

EXAMPLE 3

96 Parts of the copper phthalocyanine tetrasulphochloride obtained in usual manner by an after-treatment with thionylchloride are stirred in 2000 parts ice-water and the mixture is neutralised with sodium carbonate. 31 Parts of the hydrochloride of β-hydroxyethyl-[4-(methylaminoacetylamino)-phenyl]-sulphone in the form of an aqueous solution and 9 parts morpholine are subsequently added at the same time. The pH is maintained at 9 by the dropwise addition of a caustic soda solution. The mixture is heated to 40°, while stirring, and kept at this temperature and at the pH mentioned until caustic soda solution is no longer consumed. By the addition of sodium chloride the dyestuff is quantitatively precipitated. After drying at 100° and grinding, it is introduced into 1000 parts concentrated sulphuric acid and the mixture stirred at room temperature overnight. The dyestuff is poured on to ice, filtered off and, after the introduction into 1000 parts of ice-water, neutralised by the careful addition of a caustic soda solution. After salting out, filtering off and drying at 70° in a vacuum drying cabinet, a blue dyestuff powder is obtained which dissolves in water with a blue colour. In the form of the free sulphonic acid, the dyestuff corresponds to the following average constitution

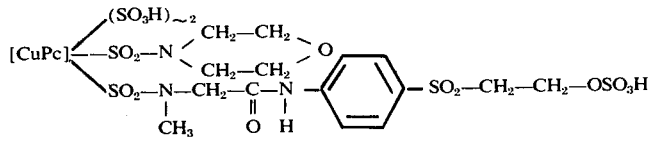

When the instructions of Example 3 are followed, but the morpholine is replaced by the amines set out in the following, valuable blue reactive dyestuffs are likewise obtained. The amount of the amine used is variable to the extent as indicated by the index (b): methylamine, dimethylamine, cyclohexylamine, benzylamine, ethanolamine, diethanolamine, taurine, N-methyl-taurine, aminoacetic acid, sarcosine, aniline etc.

EXAMPLE 4

86 Parts of the copper phthalocyanine trisulphochloride obtained in usual manner by an after-treatment with thionylchloride are slurried in 2000 parts ice-water, and the mixture is neutralised with a caustic soda solution. 62 Parts of the hydrochloride of $\beta$-hydroxyethyl-[4-(methylaminoacetylamino)-phenyl]-sulphone are subsequently added in the form of an aqueous solution. The mixture is heated to 40° and the pH maintained at 9 by the dropwise addition of a caustic soda solution. After completion of the condensation, the dyestuff is quantitatively precipitated by the addition of sodium chloride. After drying at 100°, the finely ground dyestuff powder is introduced into 1000 parts concentrated sulphuric acid. The mixture is stirred overnight at room temperature and then poured on to ice. The precipitated dyestuff is filtered off, slurried in 1000 parts ice-water, and carefully neutralised. The dyestuff is again filtered off with suction and dried. In the form of the free sulphonic acid, it corresponds to the following average constitution:

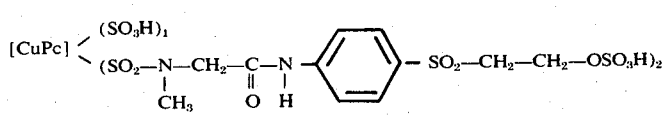

When, according to the method described following Example 1, the dyestuff is printed on cotton an intense blue turquoise shade is obtained which is characterised by good manufacturing fastness properties.

When the instructions of this Example are followed, but the copper phthalocyanine-(3)-trisulphochloride is replaced by the equivalent amount of nickel phthalocyanine-(3)-trisulphochloride, a valuable reactive dyestuff is likewise obtained, the dyeings of which exhibit, however, a markedly more greenish shade.

EXAMPLE 5

96 Parts of the copper phthalocyanine-(3)-tetrasulphochloride obtained in usual manner by an after-treatment with thionylchloride are slurried in 2000 parts ice-water and the mixture is neutralised. 71 Parts of the sulphuric acid semiester of $\beta$-hydroxyethyl-[4-(methylamino-acetylamino)-phenyl]-sulphone are sprinkled in. The temperature is raised to 35 to 40°, and the pH simultaneously maintained at between 8.5 and 9 by the dropwise addition of a sodium carbonate solution. When, under the conditions mentioned, sodium carbonate is no longer consumed, the dyestuff is separated by the addition of sodium chloride. After filtering off and drying, a blue dyestuff powder is obtained which dissolves in water with a clear turquoise-blue colour. In the form of the free sulphonic acid, the dyestuff corresponds to the following average constitution:

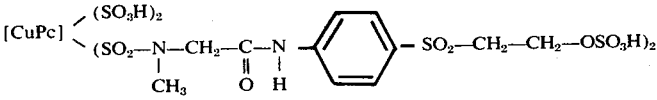

A valuable dyestuff is likewise obtained when the copper phthalocyanine tetrasulphochloride is replaced by the corresponding amount of nickel phthalocyanine tetrasulphochloride.

However, the shade obtained with this product is markedly more greenish.

I claim:

1. A phthalocyanine reactive dyestuff of the formula

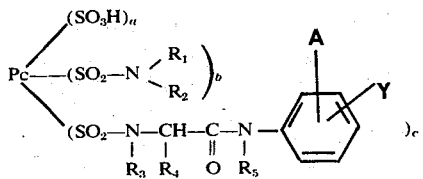

in which Pc represents the radical of a phthalocyanine joined to the indicated substituents at the 3- or 4-position of different benzene rings of the phthalocyanine nucleus; $R_1$ and $R_2$ are hydrogen, or identical or different alkyls of 1–5 carbon atoms which are unsubstituted or are substituted by hydroxy, carboxy, sulfo, morpholino, cyclohexyl, benzyl, phenyl, naphthyl, and substituted phenyl and substituted naphthyl where the substituent is lower alkoxy, carboxy, or sulfo; $R_3$ stands for hydrogen or alkyl of 1–5 carbon atoms which is unsubstituted or substituted by hydroxy or sulfo; $R_4$ and $R_5$ represent hydrogen or lower alkyl radicals; A represents hydrogen, hydroxy, lower alkoxy, carboxy, sulfo, nitro, halo, or lower alkyl; Y represents a group —$SO_2$—$CH_2$—$CH_2$—$OSO_3H$, —$SO_2$—$CH=CH_2$ or —$SO_2$—$CH_2$—$CH_2$—$S$—$SO_3H$: $a$ stands for 0, 1, 2, or 3, $b$ for 0, 1, or 2, and $c$ for 1, 2, 3, or 4, the sum total of $a$, $b$, and $c$ not exceeding 4.

2. A phthalocyanine reactive dyestuff of the formula

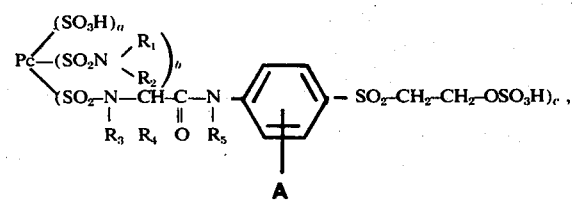

in which Pc, $R_1$, $R_2$, $R_3$, $R_4$, $R_5$, A, $a$, $b$ and $c$ have the meaning given in claim 1.

3. A phthalocyanine reactive dyestuff of the formula

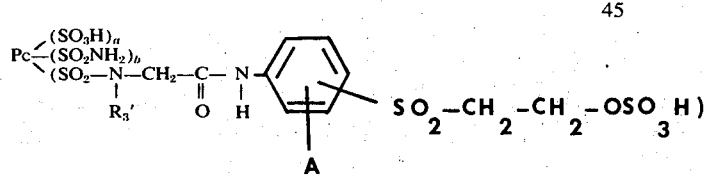

in which Pc, A, $a$, $b$ and $c$ have the meaning given in claim 1, and $R_3'$ represents a lower alkyl.

4. A phthalocyanine reactive dyestuff of the formula

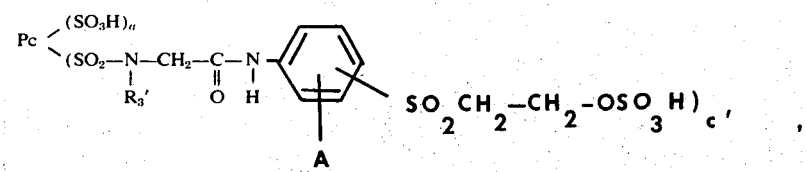

in which Pc and A have the meaning given in claim 1, $R_3'$ represents lower alkyl, $a'$ stands for 1, 2 or 3, $c'$ stands for 1, 2 or 3, the sum total of $a'$ and $c'$ not exceeding 4.

5. The dyestuff of the formula

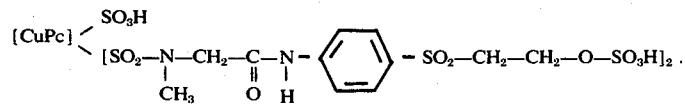

6. The dyestuff of the formula

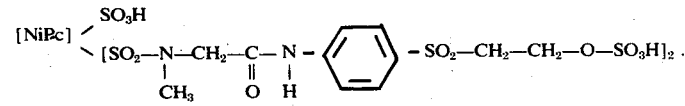

7. The dyestuff of the formula

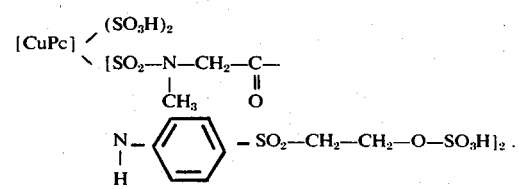

8. The dyestuff of the formula

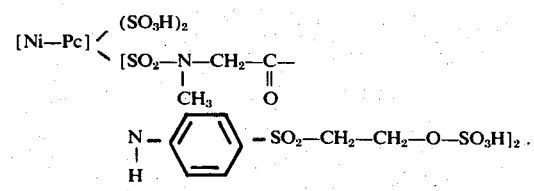

9. A phthalocyanine reactive dyestuff of claim 1 wherein said phthalocyanine is a copper phthalocyanine, a nickel phthalocyanine, or a cobalt phthalocyanine.

* * * * *